(No Model.)   5 Sheets—Sheet 1.
T. HOELDERLIN.
MACHINE FOR DROPPING CONFECTIONERY.
No. 443,281.   Patented Dec. 23, 1890.
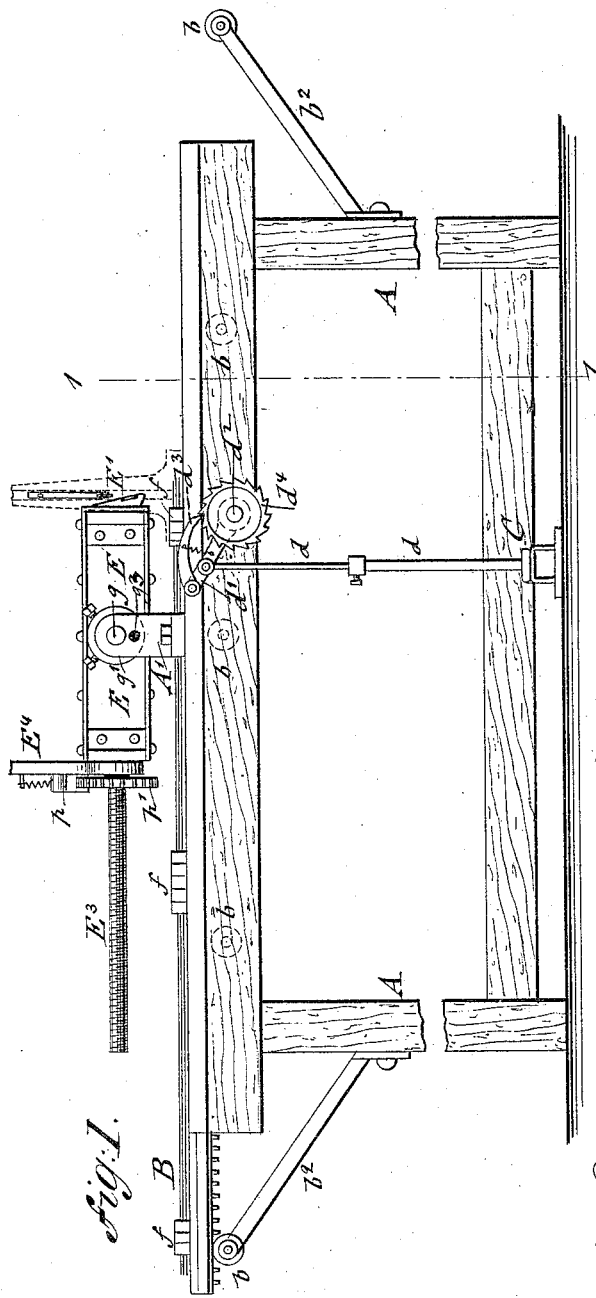
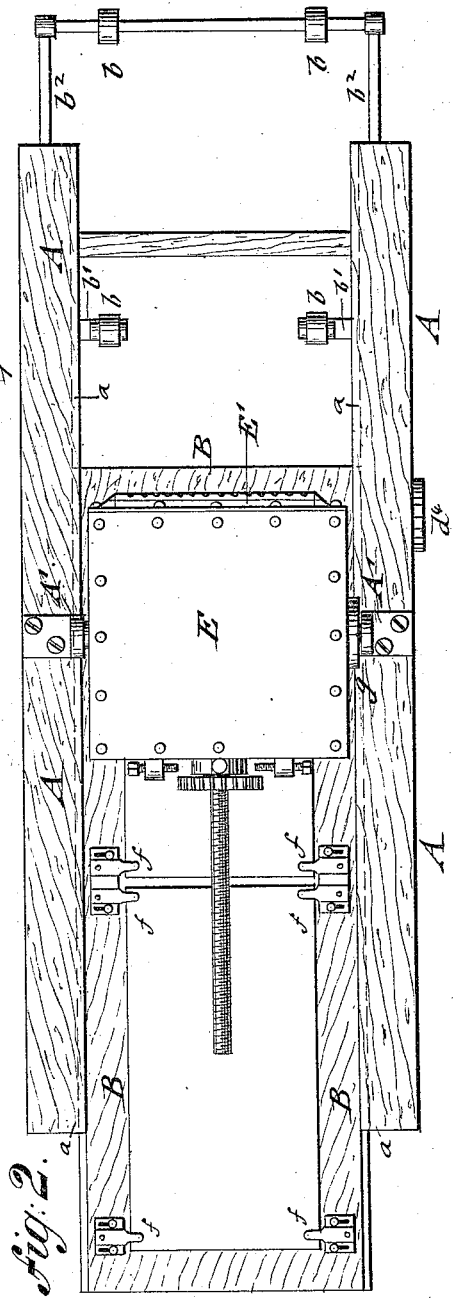
WITNESSES:
A. Schehl.
T. Reinheir
INVENTOR:
Theodor Hoelderlin
BY
Gospel & Raegener
ATTORNEYS.

(No Model.) 5 Sheets—Sheet 2.
T. HOELDERLIN.
MACHINE FOR DROPPING CONFECTIONERY.
No. 443,281. Patented Dec. 23, 1890.
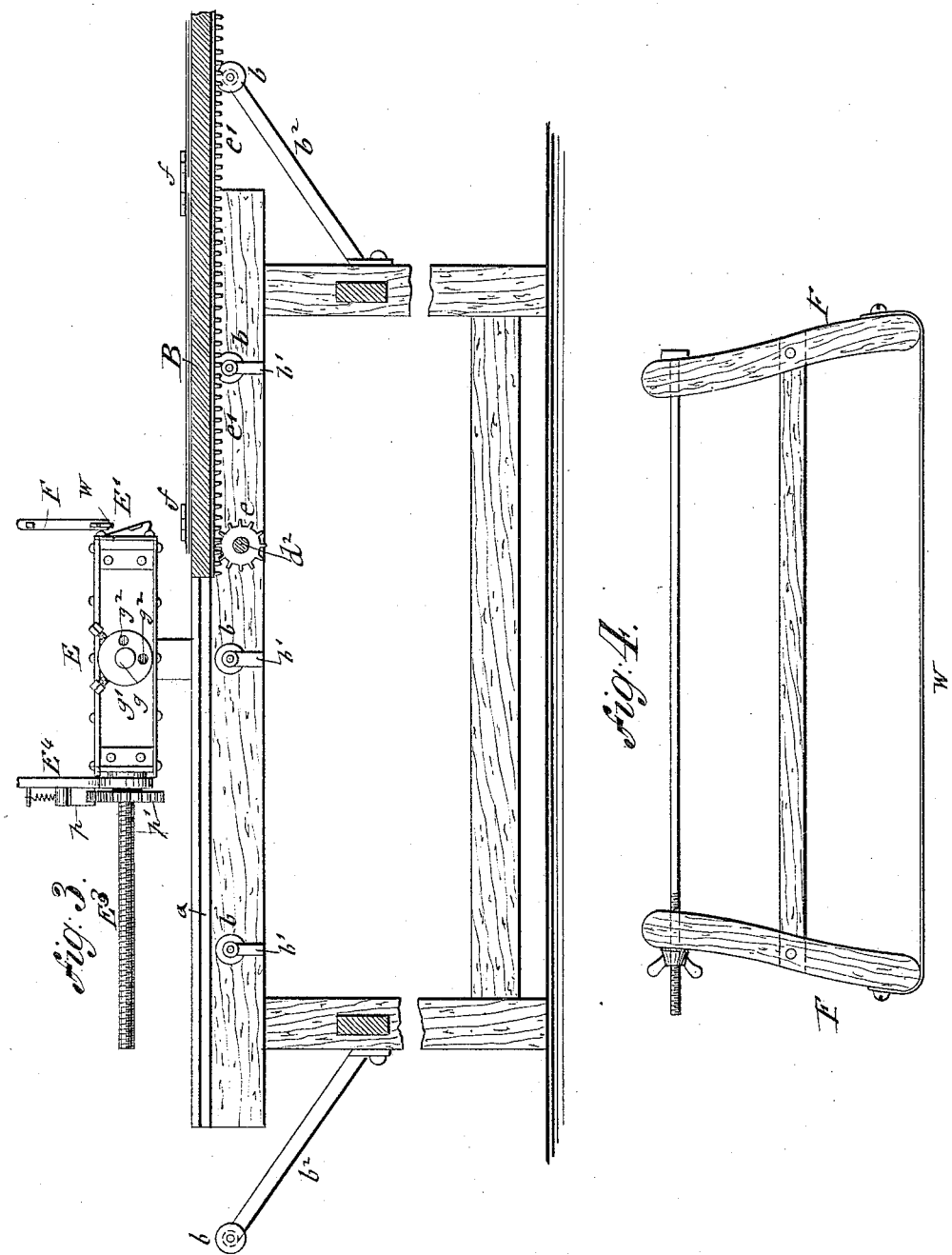
WITNESSES:
A. Schehl.
T. Reimler
INVENTOR:
Theodor Hoelderlin
BY
Gospel & Raegener
ATTORNEYS.

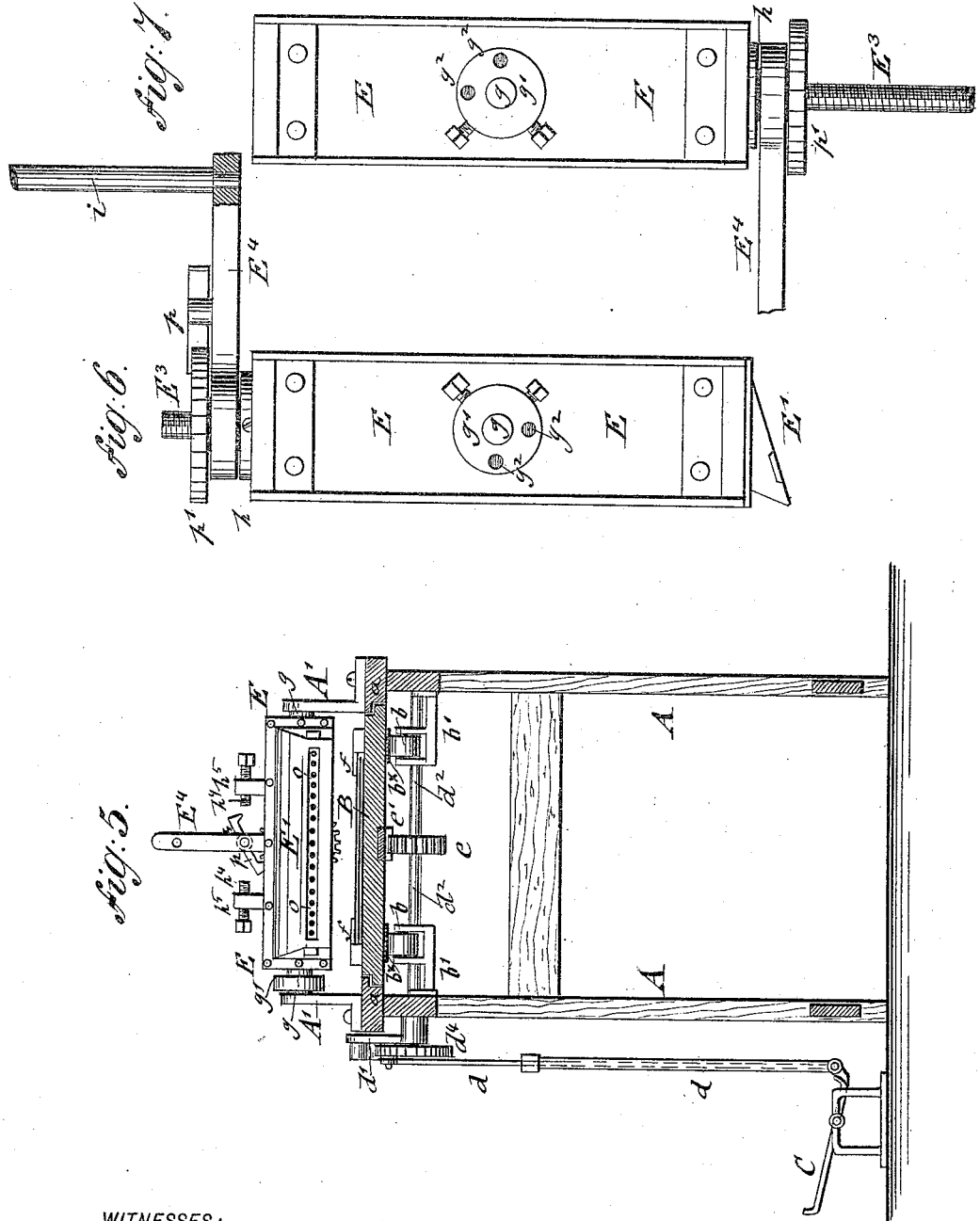

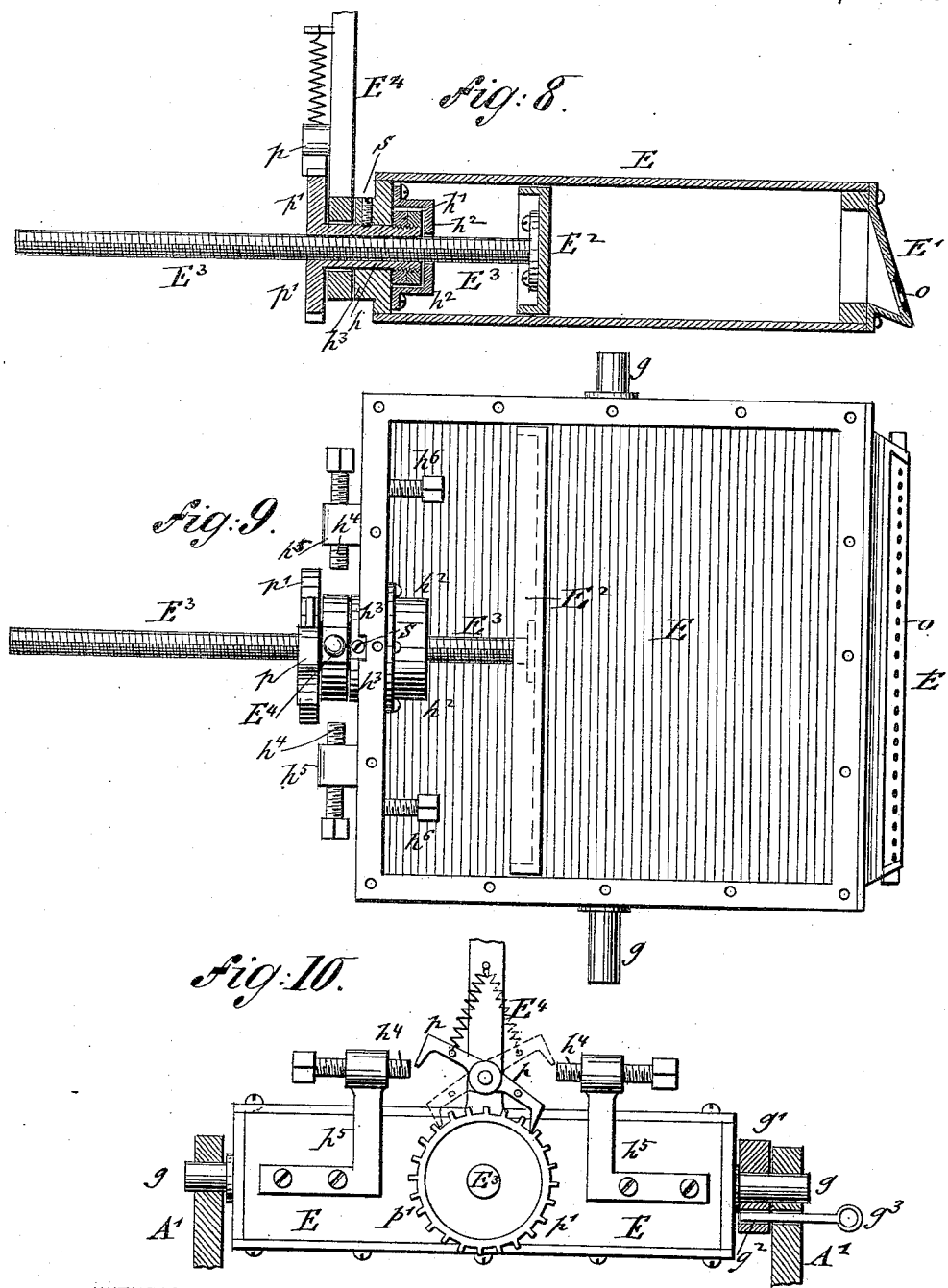

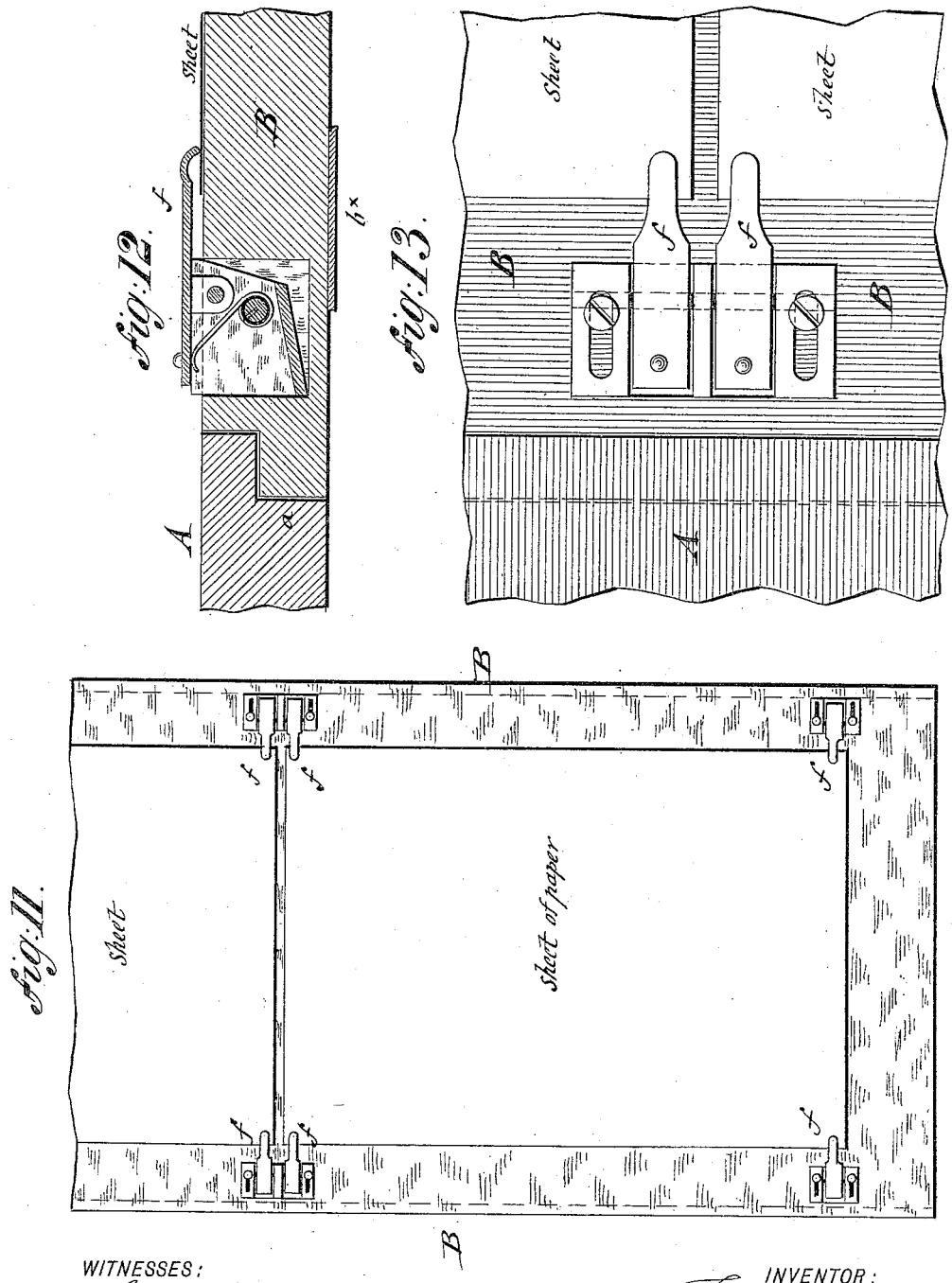

UNITED STATES PATENT OFFICE.

THEODORE HOELDERLIN, OF BROOKLYN, NEW YORK.

MACHINE FOR DROPPING CONFECTIONERY.

SPECIFICATION forming part of Letters Patent No. 443,281, dated December 23, 1890.

Application filed May 15, 1890. Serial No. 351,921. (No model.)

*To all whom it may concern:*

Be it known that I, THEODORE HOELDERLIN, of Brooklyn, in the county of Kings and State of New York, a citizen of the United States, have invented certain new and useful Improvements in Machines for Dropping Confectionery, of which the following is a specification.

This invention relates to an improved machine for dropping confectionery of that class in which the paste is forced out through a perforated spout and dropped on a sheet of paper, which is then removed to be dried; and the invention consists of a confectioner's dropping-machine which comprises a longitudinally-movable table having spring-fingers for retaining the sheets of paper, means for imparting a step-by-step motion to said table, a centrally-pivoted paste-reservoir supported on upright standards on the supporting-frame of the table, said reservoir being provided with a perforated spout at one end and with a follower at the other end, to which a step-by-step motion is imparted by suitable mechanism. The reservoir is filled by being swung on its pivots in vertical position, the perforated spout being first removed therefrom, while the follower is returned by screwing the threaded follower-rod in backward direction.

The invention consists, further, of certain details of construction and combination of parts, which will be fully described hereinafter, and finally pointed out in the claims.

In the accompanying drawings, Figure 1 represents a side elevation of my improved machine for dropping confectionery. Fig. 2 is a plan view of Fig. 1. Fig. 3 is a side elevation, partly in vertical longitudinal section, through the table. Fig. 4 is a side view of the device for cutting off the drops as they are forced through the spout. Fig. 5 is a vertical transverse section on the line 1 1, Fig. 1. Figs. 6 and 7 are side views of the paste-reservoir, showing the same respectively in position for returning the follower to its normal position and for filling said reservoir. Fig. 8 is a vertical longitudinal section of the paste-reservoir. Fig. 9 is a plan view of the same with the top plate removed. Fig. 10 is a rear elevation of the paste-reservoir, showing the mechanism for imparting a step-by-step motion to the follower; and Figs. 11, 12, and 13 are respectively a plan view of the table and a detail vertical transverse section and a top view showing the fingers for holding the sheet of paper in position on the table.

Similar letters of reference indicate corresponding parts.

Referring to the drawings, A represents the supporting-frame of my improved machine for dropping confectionery. The frame is provided with longitudinal ways $a$ for guiding a longitudinally-traversing table B, which is supported on rollers $b$, that are supported on bracket-arms $b'$, attached to the supporting-frame A, and on the ends of inclined arms $b^2$, that are attached to the end posts of the frame, as shown clearly in Figs. 1 and 3.

To the underside of the table B are applied flat rails $b^\times$, which rest on the rollers $b$, so that the table B moves over with as little friction as possible. An intermittent or step-by-step forward motion is imparted to the table B by means of a treadle C, which is connected by an adjustable pitman $d$ with an oscillating arm $d'$, that is placed loosely on the end of a transverse shaft $d^2$, supported in bearings of the frame A, said arm carrying a pivoted and spring-actuated pawl $d^3$, which engages a ratchet-wheel $d^4$ at the outer end of the transverse shaft $d^2$. To the middle part of the transverse shaft $d^2$ is keyed a pinion $e$, that meshes with a longitudinal rack $e'$, attached to the under side of the table B. By the treadle and the pawl-and-ratchet mechanism described a longitudinal step-by-step forward motion is imparted to the table B, so that the same is gradually moved from its starting position at one end of the supporting-frame A to its final position at the opposite end of the same, as shown, respectively, in Figs. 1 and 3. On the table are supported sheets of paper, which are retained thereon by means of pivoted and spring-actuated fingers $f$, which are shown in detail in Figs. 11, 12, and 13. These fingers retain the sheets in position on the table, so that the confectionery can be dropped thereon. When new sheets are to be placed in position, the fingers are lifted and the sheets placed below the same. When a sheet is filled with confectionery, it is removed by a quick pull from under the fingers, the pressure of which is not strong enough to resist the removal of the sheets by a quick pull on the same.

At both sides of the supporting-frame A are arranged two upright standards A', which are provided with bearings for supporting the central pivots or gudgeons $g$ of a paste-reservoir E, that is supported in horizontal position on said supports A' when the dropping operation takes place. To one of the gudgeons of the reservoir E is applied a disk $g'$, which is provided with two holes $g^2$, located at right angles to each other, said holes serving for locking the paste-reservoir E in horizontal or vertical position in connection with a pin or key $g^3$, that is passed through a hole in the adjacent standard A' and inserted in one of the holes $g^2$ of the disk $g'$, as shown clearly in Fig. 10. To the front end of the paste-reservoir E is applied a spout E', which is provided with a row of discharge-openings $o$, through which the paste is forced out by the pressure of a follower $E^2$ in the reservoir E and dropped onto the sheets of paper on the table B. The follower $E^2$ is attached to a threaded follower-rod $E^3$, that passes through the rear of the paste-reservoir E to the outside of the same. The threaded follower-rod $E^3$ passes through an interiorly-threaded sleeve $h$, that is attached at its inner end by a nut and jam-nut $h'$ to the rear wall of the reservoir E, said nuts being inclosed by a suitable cup $h^2$, as shown in Figs. 8 and 9. The sleeve $h$ turns freely on its axis in the rear wall of the paste-reservoir E, but is prevented from following the motion of the lever $E^4$, by which the follower is operated, by means of a radial set-screw $s$, which passes through a cylindrical boss $h^3$ on the rear wall of the reservoir E and presses on said sleeve, as shown in Figs. 8 and 9, so that the friction is greater between the sleeve and set-screw than between the lever and sleeve. Next adjacent to this boss is placed on the sleeve $h$ the hub of the oscillating lever $E^4$, the oscillations of which are determined by means of stop-screws $h^4$, that are supported in bracket-arms $h^5$, attached to the rear wall of the reservoir E, as shown clearly in Fig. 10. To the oscillating lever $E^4$ is pivoted a spring-actuated double pawl $p$, that engages a ratchet-wheel $p'$, keyed to the sleeve $h$, said pawl serving to turn the sleeve $h$ and move thereby the follower-rod and the follower in forward direction, according to the length of the oscillations of the lever $E^4$, which is regulated by the stop-screws $h^4$. When it is desired to force a larger quantity of paste through the discharge-opening $o$ in the spout E', the stop-screws are adjusted farther apart, whereby the oscillations of the lever $E^4$ are correspondingly increased, while when a smaller quantity is to be forced out through the openings of the spout the stop-screws are adjusted closer toward each other, so that the size of the oscillations of the lever $E^4$ is diminished.

As soon as the paste is forced out through the discharge-spout E' by the pressure of the follower $E^2$ in the reservoir E the drops are cut off by means of a wire W, that is stretched tightly in an oscillating frame F, as shown clearly in Fig. 4. The wire frame F is operated either by hand or guided in suitable ways of the reservoir vertically above the spout, as indicated in dotted lines in Fig. 1.

For filling the reservoir E with paste when it is empty the table B is moved to one end of the supporting-frame A, the locking-key $g^3$ of the reservoir is withdrawn from the disk $g'$, and the reservoir swung on its pivots into a vertical position with the spout downward, as shown in Fig. 6. In this position a handle $i$ is inserted into a hole of the lever $E^4$ and used as a crank for turning said lever on the sleeve $h$, while the double pawl $p$ and its spring are so adjusted that the opposite end engages the ratchet-wheel $p'$, as shown in dotted lines in Fig. 10, so that on turning the lever $E^4$ on the sleeve $h$ the ratchet-wheel $p'$ and the sleeve $h$ are turned, and thereby the follower-rod $E^3$ and the follower are quickly returned to their initial position adjacent to the rear wall of the paste-reservoir E, until the follower abuts against the interior stops $h^6$ of the rear wall. The reservoir E is then turned on its pivots into an inverted position, so that the spout is at the upper end and the follower-actuating mechanism at the lower end, in which position the spout is removed by unscrewing the fastening-screws of the same and the reservoir filled with a new quantity of paste. The spout is then replaced and the reservoir E returned into a horizontal position and locked by the key $g^3$ in the manner before described, it being then ready again for the dropping operation.

My improved dropping-machine is operated as follows: The table is moved back into position at one end of the supporting-frame by withdrawing or releasing the treadle-operating pawl $d^3$ from the ratchet-wheel $d^4$, which permits the turning of the shaft $d^2$ in following the longitudinally-traversing motion of the table B. When the table is in the position at one end of the frame A, the sheets are placed in position on the same and retained thereon by the spring-fingers $f f$. The pawl $d^3$ is then placed again into mesh with the ratchet-wheel $d^4$, so that when the treadle C is depressed the ratchet-wheel is moved forward for one or more teeth, according to the adjustment of the pitman $d$. This is necessary for the purpose of providing for the proper distance between the rows of larger or smaller drops. Simultaneously the lever $E^4$ is oscillated and a quantity of paste forced by the follower through the openings of the spout, which drops are then cut off by the severing-wire W, so that they drop along the inclined face of the spout in one row on the sheet of paper below the same. The treadle C is then again operated and the table moved forward and the next row of drops deposited on the paper by the action of the lever $E^4$ and wire W, and so on until the sheets on the table are filled with rows of drops and the table arrives at the opposite end of said frame A. The sheets are then removed from the table and the latter returned to its starting position in the manner before described. If the reservoir should be empty, it has to be refilled, which is accomplished by moving the table to one end of the supporting-frame out of the way of the paste-reservoir E, so that the same may be swung on its pivots for the purpose of returning the follower and filling the reservoir in the manner before described.

My dropping-machine is specially adapted for tough pastes, which require considerable pressure in passing through the openings of the spout of the reservoir, and which are either dropped at ordinary temperature or kept in warm state while in the reservoir, in which case the same is surrounded by a hot-water jacket in the usual well-known manner. The drops are uniform in shape and size and are deposited in regular rows at equal distances from each other onto the sheets of paper and removed with the same to the drying-rooms.

The machine is adapted for any size of drops, for which purpose the forward motion of the table is rendered adjustable, as well as is the motion imparted to the follower, while the required size of the openings of the spout is controlled by inserting interchangeable side pieces having openings of different sizes into a longitudinal recess of the spout E', as shown clearly in Figs. 8 and 9. It is obvious that when larger drops are to be made not only the openings of the spout have to be larger, but also the intermittent forward motion of the follower and the distance between the rows have to be increased, which is accomplished by the different adjusting mechanism heretofore described.

Having thus described my invention, I claim as new and desire to secure by Letters Patent—

1. The combination of a supporting-frame having standards at opposite sides, a paste-reservoir pivoted to said standards, a disk having holes keyed to one of said pivots, and a locking-key passing through a hole of one of said standards and engaging one of the holes of said disk, whereby the paste-reservoir may be supported in horizontal or vertical position, substantially as set forth.

2. The combination of a paste-reservoir having an inclined perforated spout at the front end and a threaded sleeve in the rear end, a follower in said reservoir, a threaded follower-rod passing through said sleeve, an oscillating lever turning loosely on said sleeve, a ratchet-wheel keyed to said sleeve, and a spring-pawl applied to the oscillating lever and adapted to engage the ratchet-wheel, so as to move the follower in forward direction in the reservoir, substantially as set forth.

3. The combination, with a paste-reservoir having a perforated spout at one end and a threaded sleeve in the opposite end, of an interior follower, a screw-threaded follower-rod passing through said sleeve, an oscillating lever placed loosely on said sleeve, a ratchet-wheel on said sleeve, a pawl pivoted to said oscillating lever, and stop-screws supported on bracket-arms at each side of said lever, so as to limit the extent of oscillating motion of the lever, substantially as set forth.

In testimony that I claim the foregoing as my invention I have signed my name in presence of two subscribing witnesses.

THEODORE HOELDERLIN.

Witnesses:
PAUL GOEPEL,
W. REIMHERR.